Jan. 13, 1931.   L. R. CARLEY   1,789,035
FASTENER AND MEANS FOR ATTACHING IT
Filed Jan. 16, 1929
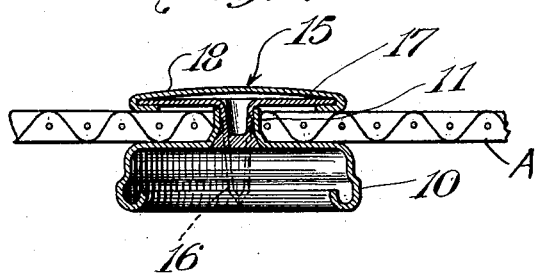
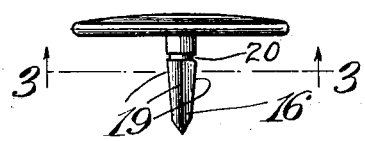
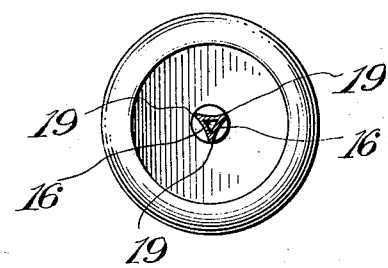
Inventor
Leonard R. Carley.
By Attorney
Emery, Booth, Janney & Varney Patented Jan. 13, 1931

1,789,035

UNITED STATES PATENT OFFICE

LEONARD R. CARLEY, OF WATERTOWN, CONNECTICUT, ASSIGNOR TO PATENT BUTTON COMPANY, OF WATERBURY, CONNECTICUT, A CORPORATION OF CONNECTICUT

FASTENER AND MEANS FOR ATTACHING IT

Application filed January 16, 1929. Serial No. 332,983.

This invention relates to fasteners of the button type in which the button is secured to fabric or other material by a rivet or tack. The button may be either of the type adapted to cooperate with a loop or the type adapted to cooperate with a mating button of the snap fastener variety. More particularly the invention relates to the means of forming and attaching such fasteners to material; an object of the invention being to provide an improved fastener construction that is exceedingly efficient in operation and relatively cheap to manufacture.

Other objects will be apparent from the following description of a representative embodiment of the invention illustrated in the accompanying drawings, wherein:

Figure 1 is a sectional view of the fastener assembly attached to a piece of fabric;

Figure 2 is a side elevation of a rivet or attaching member employed for attaching the fastener member; and Figure 3 is a cross section taken on the line 3—3 of Figure 2.

In attaching fastener assemblies to material difficulties have been experienced by reason of the fastener member slipping sidewise over the material with reference to its attaching member causing in some instances ripping of the material and in other instances distortion or disruption of the fastener member or attaching member or both. According to this invention these difficulties are eliminated by providing a portion on the fastener member adapted to enter or pierce the material and hold the fastener member securely against slippage while it is being attached.

It is desirable that fastener members be as thin as possible in order that they will not be conspicuous or inconvenient and will pass through laundry machines when used on washable material such as overalls. In fasteners or buttons of the snap fastener type this is often difficult of realization because the attaching members project so far into the fastener member as to interfere with the proper mating of the member with its companion member unless the members are made relatively deep or thick. According to this invention the interacting portions instrumental for connecting the fastener member and attaching member are disposed substantially in the plane of the material to which attachment is made, thus interfering neither with the length of the fastener member nor with the size of the head of the attaching member.

Various types of attaching members such as eyelets, rivets, tacks, staples and the like entrain threads of material with them as they pass therethrough, thus weakening the material and leaving unsightly strands and ends of material in the fastener member when the attachment has been completed. Herein the attaching member is formed with longitudinal edges which are suitably shaped and sufficiently sharp to sever a few strands and push back others in passing through the material.

Proceeding now to a consideration of the specific embodiment of the invention shown in the drawings, the fastener member comprises a shell 10 provided with a relatively small piercing barrel 11 which is tapered interiorly for holding the end of such attaching member as may be bradded or upset therein. As may be seen in Figure 1, the small barrel 11 has pierced the material A and the fastening member will, therefor, be held against slippage during attachment, which is so often the case when the ordinary form of flat-bottomed shell is used. The fastener member or button may be of any suitable type whether an ordinary button adapted to cooperate with a loop or a snap fastener button adapted to cooperate with a mating member. The particular fastener member illustrated is a rigid socket member adapted to take a resilient stud member.

The rivet or attaching member 15 illustrated comprises a hollow pointed shank 16 and an end flange 17. It may conveniently be formed by spinning or extruding. Also, if desired, the open end of the rivet may be closed by a cap 18 crimped at its rim beneath the flange 17. To assist in upsetting or bradding the rivet it is formed with a circumferential groove 20 on its shank. Of course, the circumferential groove 20 will weaken the attaching member about the groove, as will be readily understood. After the rivet is formed by spinning or extruding the shank is crimped by squeezing in a die to form a plurality of relatively sharp longitudinal edges 19 thereon for cutting and parting strands as it passes through the material.

In Figure 1 the rivet is shown bradded within the barrel of the fastener member. From this view it is seen that the upset portion lies principally if not entirely within the barrel and does not project into the cupped portion of the fastener shell to interfere with the entry of a mating member. A solid tack or rivet if used would be upset within the barrel in the same manner as the hollow rivet shown. The hollow rivet, however, is simple and cheap to manufacture and makes a light assembly.

While only one embodiment of the invention has been particularly illustrated and described it is to be understood that various changes and modifications may be made within the spirit of the invention as set forth in the appended claims.

I claim as my invention:

1. A fastener comprising a fastener member shell, a barrel on said shell for piercing material, said barrel being interiorly tapered, a headed attaching member cooperating with said shell and bradded within said tapering barrel, said attaching member comprising a hollow pointed shank, a head flange on said shank and a cap on said flange closing the open end of the attaching member, said shank being crimped to form a plurality of longitudinal cutting edges.

2. A fastener comprising a fastener member, a piercing barrel on said member and said piercing barrel adapted to penetrate the material to which the fastener is to be attached, said barrel being interiorly tapered to retain an attaching member, and an attaching member cooperating with said fastener member, said attaching member having a shank deformed within said tapered barrel and entirely filling the same to connect the parts.

3. A fastener comprising a shell, a barrel formed on said shell and adapted to pierce the material to which the fastener is secured, a rivet cooperating with said shell barrel and entirely filling the same, the effective connection between the shell barrel and rivet adapted to be disposed substantially in the plane of said material.

4. A fastener comprising a shell, a rivet cooperating with said shell to hold said parts together, said rivet comprising a hollow fluted shank tapering to a point at one end and provided with a head flange at the other end, said flutes being sufficiently sharp on their edges to sever the material to which the fastener is attached.

5. A rivet for fasteners comprising a hollow shank provided with a point at one end, fluted longitudinal ribs extending from the point toward the base, and a circumferential weakening groove near the base of the shank.

6. A fastener comprising a shell provided with a protruding barrel, said barrel adapted to pierce the material to which the fastener is attached, a hollow rivet cooperating with said member within said barrel, said rivet being formed with a circumferential horizontally disposed depression on its shank to aid in upsetting the same and said barrel retaining the shank while being upset.

7. A fastener comprising a fastener member provided with a protruding barrel, a hollow rivet formed with fluted cutting ribs and a circumferential weakening groove on its shank upset within said barrel to clinch said member and rivet together.

8. A fastener comprising a shell with a protruding tapering barrel and said barrel adapted to pierce the material to which it is attached to prevent the same from slipping during attachment and a headed hollow shank rivet having its shank deformed within said barrel so as to entirely fill the barrel to clinch said member and rivet together.

In testimony whereof, I have signed my name to this specification this 14th day of January, 1929.

LEONARD R. CARLEY.